US007653690B2

(12) United States Patent
Block

(10) Patent No.: US 7,653,690 B2
(45) Date of Patent: Jan. 26, 2010

(54) METHOD AND APPARATUS FOR ELECTRONIC POSTCARD COMMUNICATION

(75) Inventor: Allan J. Block, Toledo, OH (US)

(73) Assignee: Block Communications, Inc., Toledo, OH (US)

( * ) Notice: Subject to any disclaimer, the term of this patent is extended or adjusted under 35 U.S.C. 154(b) by 0 days.

(21) Appl. No.: 10/559,714

(22) PCT Filed: Jun. 5, 2003

(86) PCT No.: PCT/US03/17711

§ 371 (c)(1),
(2), (4) Date: Mar. 21, 2007

(87) PCT Pub. No.: WO2004/109533

PCT Pub. Date: Dec. 16, 2004

(65) Prior Publication Data

US 2008/0059585 A1    Mar. 6, 2008

(51) Int. Cl.
*G06F 15/16* (2006.01)
(52) U.S. Cl. ...................................... 709/206; 709/229
(58) Field of Classification Search .................. 709/201, 709/203, 206, 238, 245, 250, 229
See application file for complete search history.

(56) References Cited

U.S. PATENT DOCUMENTS

| 5,426,594 | A | * | 6/1995 | Wright et al. | ................ | 709/206 |
| 6,018,774 | A | * | 1/2000 | Mayle et al. | ................ | 709/203 |
| 6,542,936 | B1 | | 4/2003 | Mayle et al. | | |
| 2001/0051876 | A1 | * | 12/2001 | Seigel et al. | ................... | 705/1 |
| 2002/0044687 | A1 | | 4/2002 | Federman | | |
| 2002/0143558 | A1 | | 10/2002 | Joseph | | |
| 2003/0115286 | A1 | * | 6/2003 | Mayle et al. | ................ | 709/203 |
| 2006/0178986 | A1 | * | 8/2006 | Giordano et al. | .............. | 705/40 |

FOREIGN PATENT DOCUMENTS

| CA | 2 330 991 A1 | 7/2002 |
| WO | WO 99/01818 | 1/1999 |
| WO | WO 01/80150 A1 | 10/2001 |

\* cited by examiner

*Primary Examiner*—Paul H Kang
(74) *Attorney, Agent, or Firm*—Fraser Clemens Martin & Miller LLC; Donald R. Fraser

(57) ABSTRACT

A method and an apparatus for communicating with electronic postcards include a server for processing electronic postcards. Input sites remote from the server are selected based upon exposure to significant numbers of business travelers and tourists and provided with input devices. A verified communication link is established between the input devices and the server. A sender generated postcard request received at one of the input devices including an addressee e-mail address (38), a sender message (36) and a scene selection (33) transmits an electronic postcard (30) to the addressee.

18 Claims, 4 Drawing Sheets

METHOD AND APPARATUS FOR ELECTRONIC POSTCARD COMMUNICATION

BACKGROUND OF THE INVENTION

The present invention relates generally to a method and a system for creating and delivering electronic postcards.

Electronic communication has provided new ways to communicate greetings and short messages that typically are sent on cards such as greeting cards and postcards. In order to send a card, one must find a place to purchase the card, a postage stamp to affix to the card and a post office at which to mail the card. When one is travelling in an unfamiliar location, the steps associated with sending a card are particularly difficult.

Currently, a number of vendors maintain web sites that enable a person to create and send an electronic "greeting card" via e-mail. Such web sites provide a plurality of "cards" each having graphics and an associated message to which the sender can add a typed personal message. Typically, there are available a relatively small selection of "standard cards" and a larger selection of "premium cards" available to registered "members". The sender provides an e-mail address for the addressee and the vendor associated with the web site transmits the "greeting card". The vendor may send a confirmation (delivery or non-delivery) to an e-mail address provided by the sender. However, such systems require the sender have access to and operate an Internet connected computer, and the sender must provide personal information and a credit card number to access the "premium cards".

The U.S. Pat. No. 5,343,386 shows an apparatus housed in a booth for producing printed postcards incorporating a self-portrait of the sender with a selected one of several standard pictorial backgrounds. A cash-receiving device, a video camera, a monitor and background selection buttons are connected to a computer that controls the operation of the apparatus.

The U.S. Pat. No. 5,587,740 shows a kiosk equipped with a digital camera for taking a photograph of a user in front of a scenic attraction. The kiosk also includes a computer, a credit card reader, a telephone connection and a color printer.

The U.S. Pat. No. 6,018,774 shows a system for creating an electronic postcard incorporating a user supplied image and optional text, such as a handwritten message, and sending a notification with an identifier to a recipient. The recipient must access a server with the identifier to view and print the postcard.

The U.S. Pat. No. 6,161,131 and the related U.S. Pat. No. 6,370,568 show an apparatus for creating a digital postcard and sending the postcard to a recipient via the Internet. The apparatus includes a digital camera for generating an image that is combined with a selected postcard template including geographical information overlaid on the image.

SUMMARY OF THE INVENTION

The present invention concerns a method and an apparatus for communicating with electronic postcards including: providing a server for processing electronic postcards; selecting at least one input site remote from the server; establishing a verified communication link between the at least one input site and the server; providing a sender input device at the at least one input site for receiving input information from a sender, the request including an addressee e-mail address; inputting sender information to the input device; generating an electronic postcard from the sender information; and transmitting the electronic postcard from the at least one input site to the server and from the server to the addressee e-mail address.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

A person desiring to send a postcard (a "sender") from a travel location must first find a postcard sales location, then correctly address the card to the addressee, purchase and affix the proper postage and find a post office at which to mail the card. All of these steps take time and effort, and a failure to complete any one step frustrates the objective of informing the addressee that the sender was thinking about him or her. The method according to the present invention simplifies or eliminates each of the above-described steps so that "postcards" are easier to send and thus more likely to be sent.

Figure 1:
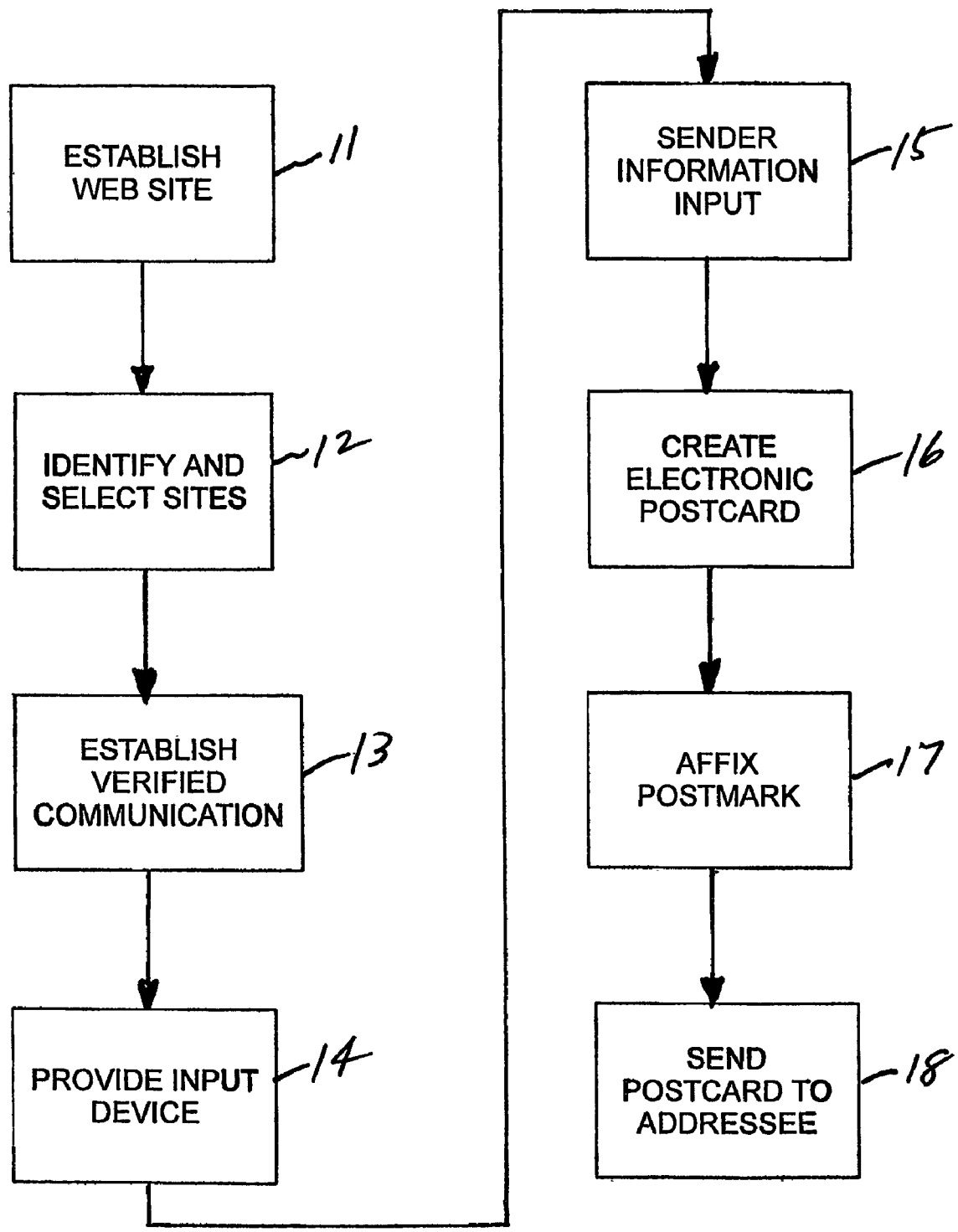
FIG. 1 is a flow diagram of a method of establishing "electronic postcard" communication according to the present invention.

As shown in FIG. 1, the method according to the present invention begins at a step 11 of establishing a web site to enable a sender to create and address an electronic postcard that is delivered to an addressee. As discussed below, the web site is implemented with a server that can be connected to the Internet or a similar communications network. Although a web site is utilized in this example, a server type computer having communication capabilities can be utilized to communicate with the input site. In a next step 12, potential input sites are identified at which the transaction of inputting the sender information and payment for the service will take place. For example, likely input sites are gift shops in hotels, airports and tourist attractions, front desks at hotels and motels, theme parks and other sites all of which typically sell printed postcards and are exposed to significant business traveler and/or tourist traffic. Once an identified input site is selected for participation in the method according to the present invention, verified communication is established between the input site and the web site in a step 13. Verified communication requires the web site to authenticate that an incoming request for an electronic postcard is originating from a particular one of the selected input sites. In a step 14, an input device is provided at each of the selected input sites. The input device can be any suitable means for communicating with the web site such as a dedicated terminal or a personal computer running software necessary to communicate with the web site.

Now the method according to the present invention is ready to create and send electronic postcards. In a step 15, a sender provides input information to the input device located at one of the selected input sites including an e-mail address for the addressee and a selection of a local scene. As one alternative, the sender inserts required information, including a handwritten message if desired, onto a preprinted form. The completed form is presented to an operator along with payment for the service and the sender has completed all of the work required of him or her. The operator uses the input device to create the electronic postcard from the information placed on the form by the sender. In some instances, the person receiving the form from the sender may be at a location that has a relatively low volume of transactions such as the reception desk at hotel. In those instances, the input site may include the pickup site of the person, e.g. a reception clerk, receiving the forms and a separate transmission site for the operator and the input device. Forms could be collected at various pickup sites and delivered to the transmission site.

In another alternative, the sender inputs the required information, including a handwritten message if desired, directly into the input device. In a step 16, the input device transmits the completed electronic postcard to the web site and the web site verifies the identity of the input site. The web site then affixes to the electronic postcard a postmark associated with the identified input site in a step 17. Now the web site sends the electronic postcard to the addressee at the associated e-mail address in a step 18. As an alternative, the input site can include the postmark which would be verified by the web site before transmitting the electronic postcard to the addressee.

Figure 2:
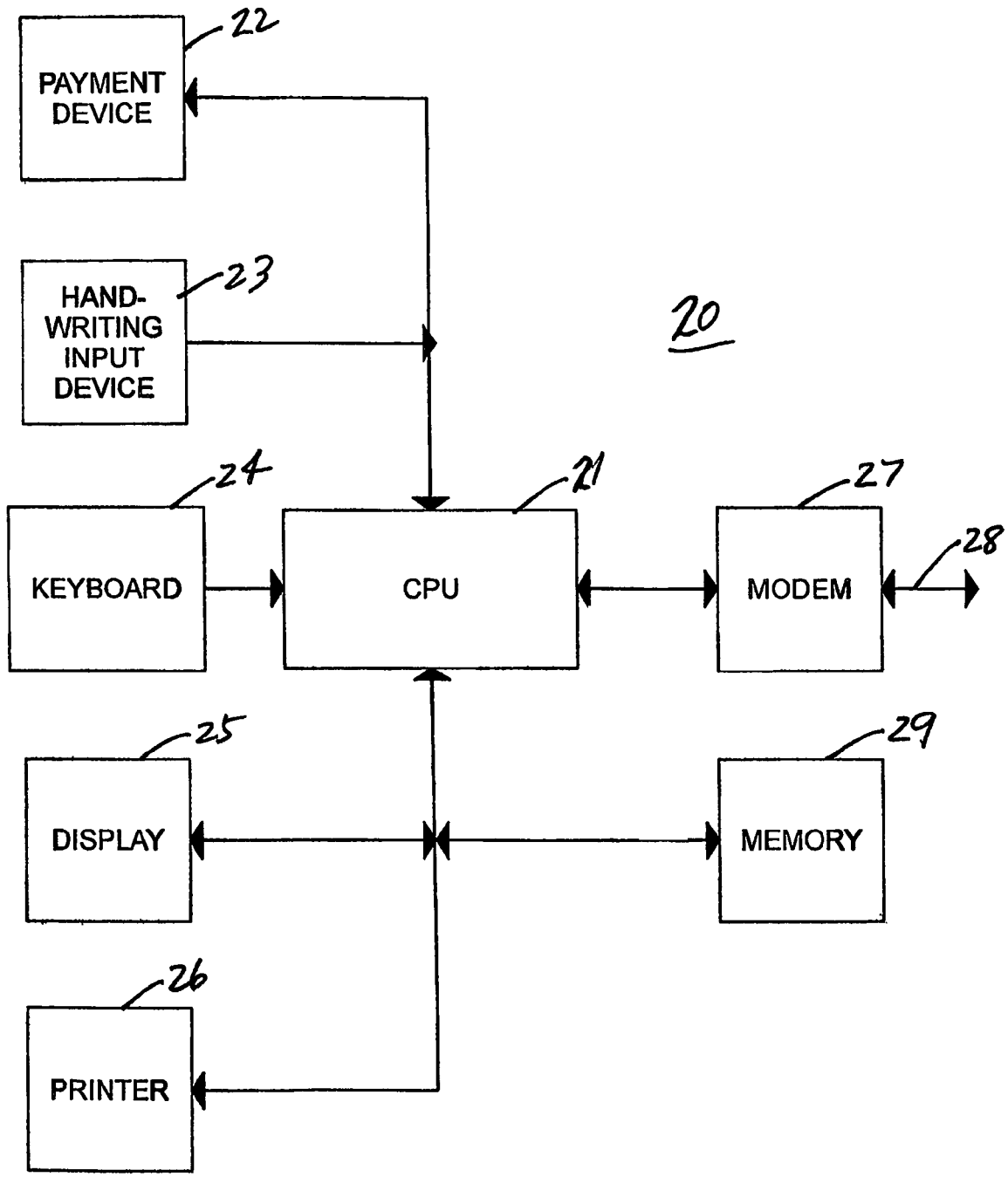
FIG. 2 is a block diagram of a terminal for creating an electronic postcard in accordance with the present invention.

There is shown in FIG. 2 a terminal 20 according to the present invention for use as the input device to create an electronic postcard according to the method of the present invention. A central processing unit CPU 21 controls the operation of the terminal 20 and has ports connected to several peripheral devices. One port of the CPU 21 is connected to an output of a payment device 22 that can operate to accept one or more modes of payment from the user. For example, the payment device 22 can include one or more of a conventional credit card reader, a conventional coin and bill acceptor and a conventional token acceptor. The payment device 22 also could be a keypad for entering a payment code obtained from a separate payment device as typically used at a gas station with a non-attended car wash. Furthermore, the payment device 22 can be any type of control actuated by a human operator to activate the terminal 20 in response to receipt of payment in any selected form.

A handwriting device 23 is connected to a port of the CPU 21 for converting a handwritten message into digital form to be incorporated in the electronic postcard. The message is converted in such a manner that the original handwriting can be displayed to an addressee.

A keyboard 24 is connected to a port of the CPU 21 for user input of information such as a message (instead of a handwritten message) and an addressee name and address. The address can be an e-mail address for electronic delivery, a mailing address for a hard copy delivery, or both.

A display 25 is connected to a port of the CPU 21 for generating images to aid the user in the creation of the electronic postcard. The display 25 can include a touch screen that performs a portion or all of the functions of the payment device 22 and the keyboard 24. For example, the payment code and the user message can be input through the display 25 rather than through the payment device 22 and the keyboard 24 respectively. The display 25 also can be used to prompt the user to perform required tasks, verify inputted information and display scene images as described below.

A printer 26 can be connected to a port of the CPU 21 for generating a payment receipt and/or verification of the addressee information and/or a hard copy of the electronic postcard.

A modem 27 is connected to a port of the CPU 21 for two-way communication whereby the electronic postcard is transmitted on a communication line 28 connected to the modem. As discussed below, the terminal 20 is configured to operate as a component of an electronic postcard delivery system.

A memory or data storage device 29 is connected to a port of the CPU 21 and stores a plurality of digital images typically related to scenes found in the area around the location of the terminal 20. The CPU 21 can cause these stored scenes to be reproduced on the display 25 for viewing and selection by the user. The selection can be made using any suitable device such as the keyboard 24 or a touch screen of the display 25. The scene selection, message and addressee information can be accumulated and stored in the memory 29 until the electronic postcard is complete and ready to be sent through the modem 12 onto the communication line 28.

Figure 3:
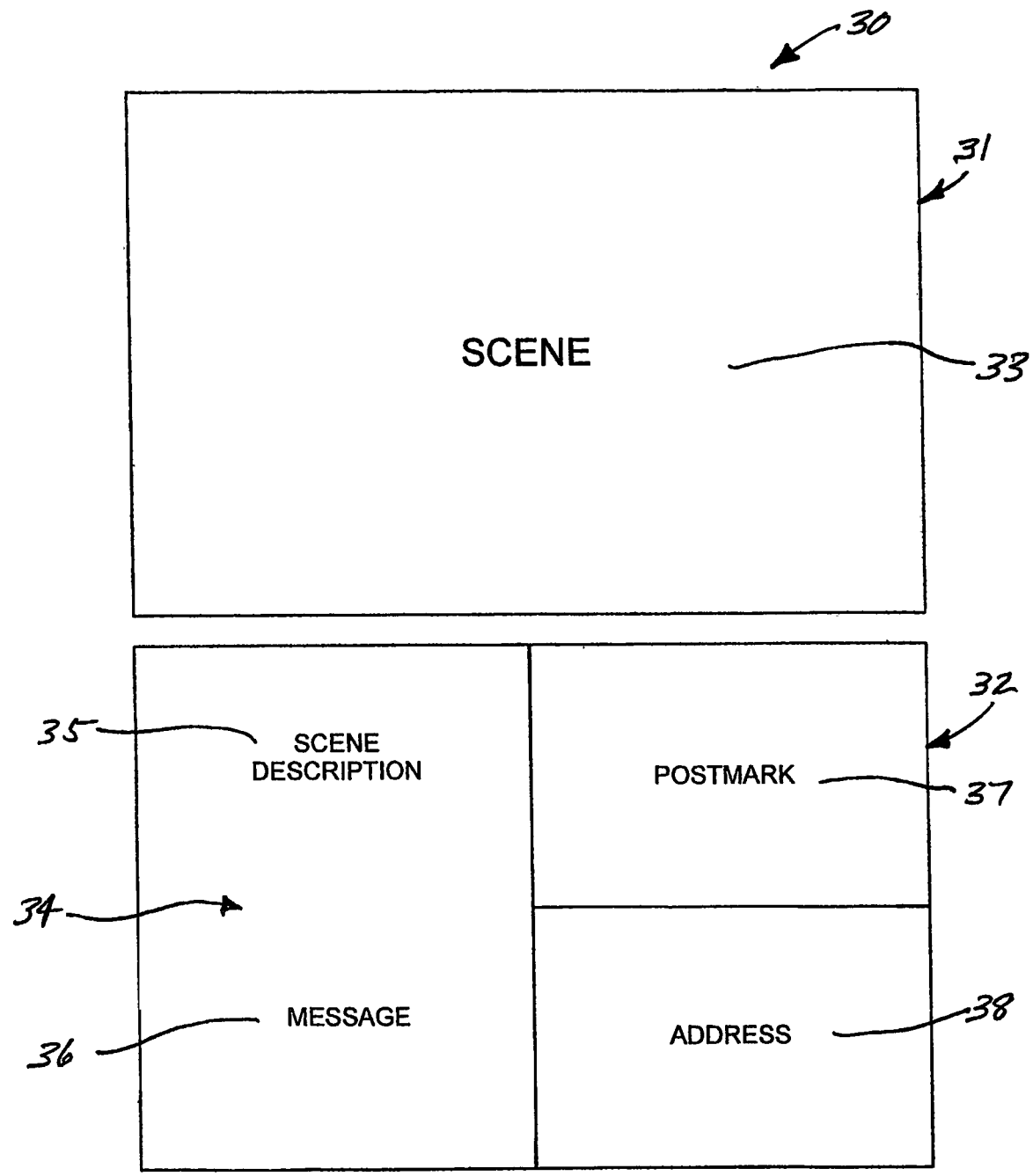
FIG. 3 is schematic view of the electronic postcard layout and content as created by the terminal shown in FIG. 2.

Referring to FIG. 3, there is shown a graphic representation of an electronic postcard 30. Although the electronic postcard 30 is depicted using the layout of a typical paper postcard, any suitable arrangement of the information can be used for an electronic display and/or a hard copy. The postcard 30 includes a scene "side" 31 and a message "side" 32. Associated with the scene side 31 is a scene information area 33 representing a selected one of a plurality of available images stored in the memory 29 of the terminal 20 shown in FIG. 1. The message "side" 32 is divided into a message information area 34, including a scene description 35 and a user generated message 36, a postmark information area 37 and an address information area 38. The scene description 35 typically is a short identification of the scene information in the area 33. The message information 36 is the handwritten or typed message entered into the terminal 20 by the user. The postmark 37 can include a location identification such as the business (hotel gift shop), the city and the country where the electronic postcard 30 was generated. If authenticity is important, a verification code can be generated by the terminal 30 and included in the postmark 37. The address 38 can be an e-mail address and/or a postal address for use as described below. The layout of the postcard 30 shown in FIG. 2 is simply illustrative of how the information can be displayed on a computer screen or printed out.

Figure 4:
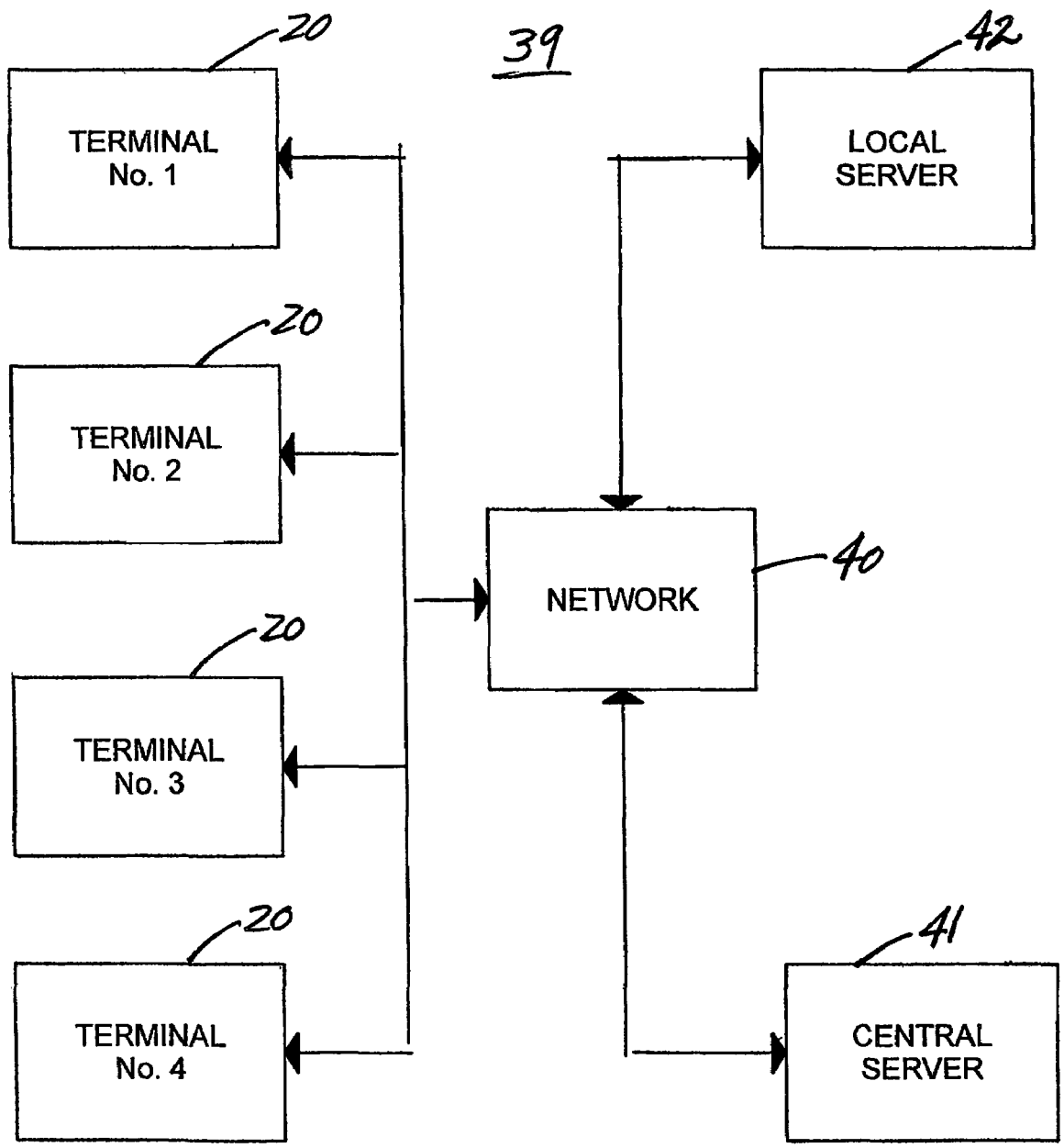
FIG. 4 is a block diagram of a communication system incorporating the terminal shown in FIG. 2.

There is shown in FIG. 4, an electronic postcard system 39 according to the present invention. The system includes a plurality of the input device terminals 20 available at the selected input sites throughout the world. Such locations might be, for example, businesses that traditionally sell preprinted postcards. The terminals 20 are connected by the communication line 28 to a communication network 40 such as a telephone network, a cable television network and/or the Internet. Also connected to the network 40 is a central server 41 located at the web site that processes the electronic postcards from the plurality of terminals 20. The central server 41 can either verify the postmark 37 as having come from a corresponding one of the terminals 20 or add the postmark to the postcard 30. The central server 41 also stores the postcard 30 for reference should an addressee request verification of the postmark. Then the central server sends the postcard 30 to the e-mail address of the addressee through the network 40. If a postal address is provided in addition to or instead of the e-mail address, the central server 41 can generate a hard copy of the postcard 30 that can be mailed by the operator of the central server.

A local server 42 can be connected to the network 40. The local server 42 represents, for example, an association with a geographical area such as a country where it is more efficient to process the postcards directed to addressees in that country through the local server than through the central server 41. However, the local server 42 would also communicate all postcards to the central server 41. The central server 41 can then accumulate operating data from the system 39 such as the volume of postcards generated by each of the terminals 20, and payments collected and fees owed by the local operators of the terminals.

The central server 41 and/or the local server 42 also can maintain account information for a frequent user of the system. The account information can include, for example, credit card charge authorization data, a list of postcards sent and/or an address book of e-mail addresses (postal addresses, telephone numbers, etc.) to make it more convenient to send an electronic postcard and make less likely that the user will forget to send a postcard to someone.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for communicating with electronic postcards comprising:
   a) providing a server for processing electronic postcards;
   b) selecting at least one input site remote from the server, wherein the at least one input site is selected from a predetermined group of input sites consisting of a gift shop, a hotel front desk, a motel front desk and a theme park, the at least one input site accessible to a plurality of senders of electronic postcards visiting the at least one input site;
   c) establishing a verified communication link between the at least one input site and the server, wherein the verified communication link authenticates that incoming requests for electronic postcards originate from particular ones of the predetermined group of input sites;
   d) providing a sender input device at the at least one input site for receiving input information associated with each of the senders including an addressee e-mail address;
   e) providing a printed form for each sender upon which the input information is recorded including a message handwritten by the sender and inputting for each sender the input information to the input device;
   f) generating an electronic postcard from the sender input information; and
   g) transmitting the electronic postcard from the at least one input site to the server and from the server directly to the addressee e-mail address.

2. The method according to claim 1 including performing said step a) by operating a web site from the server and wherein said step c) includes connecting the at least one input site to the server over the Internet.

3. The method according to claim 1 including providing the printed form for recording the sender input information and performing said step e) by a person other than the sender utilizing the sender input information recorded on the form by the sender.

4. The method according to claim 1 including performing said step e) by the sender inputting the sender input information into the input device.

5. The method according to claim 1 including performing said step e) by the sender selecting a local scene from a plurality of local scenes stored in one of the at least one input device and the sewer.

6. The method according to claim 1 including affixing a verified postmark to the electronic postcard, the verified postmark being uniquely associated with the at least one input site.

7. The method according to claim 1 including the step of providing a payment device adapted to accept one or more modes of payment from the sender.

8. The method according to claim 7 wherein the payment device is at least one of a credit card reader, a coin and bill acceptor, a token acceptor, and a keypad for entering a payment code obtained from a separate payment device.

9. A method for communicating with electronic postcards comprising:
   a) selecting at least one input site and storing a plurality of images related to the at least one input site, wherein the at least one input site is selected from a predetermined group of input sites consisting of a gift shop, a hotel front desk, a motel front desk, and a theme park;
   b) providing an input device at the at least one input site for receiving a postcard request from a sender visiting the at least one input site, the request including a selection of at least one of the stored images, a message and an addressee address, wherein the input device includes a printed form and a computer terminal;
   c) establishing a verified communication link between the at least one input site and the server, wherein the verified communication link authenticates that the request for electronic postcards originates from particular ones of the predetermined group of input sites;
   d) generating an electronic postcard in response to the request, the electronic postcard including the at least one stored image and the message;
   e) affixing a verified postmark to the electronic postcard, the verified postmark being uniquely associated with the at least one input site; and
   f) transmitting the electronic postcard directly to the addressee address.

10. The method according to claim 9 including performing said step b) by selecting a location that sells preprinted postcards as the at least one input site.

11. The method according to claim 9 including performing said step f) by transmitting the electronic postcard on the Internet.

12. The method according to claim 9 including providing the sender with a printed copy of the electronic postcard.

13. The method according to claim 9 including the step of providing a payment device adapted to accept one or more modes of payment from the sender.

14. The method according to claim 13 wherein the payment device is at least one of a credit card reader, a coin and bill acceptor, a token acceptor, and a keypad for entering a payment code obtained from a separate payment device.

15. An apparatus for generating printed postcards comprising:
   a) a server means located at a predetermined location;
   b) at least one input device located at an input site at a travel location remote from said server means for receiving from a sender visiting the travel location a postcard request including an addressee address, a handwritten sender message and a selection of a scene related to the travel location of said input site and not provided by the sender, wherein the at least one input site is selected from a predetermined group of input sites consisting of a gift shop, a hotel front desk, a motel front desk and a theme park;
   c) a verified communications connection for selectively connecting said at least one input device to said server means, said at least one input device and said server means being responsive to said postcard request for transmitting an electronic postcard including a verified postmark from said server means directly to the addressee address, said electronic postcard including said at least one of a sender message and a scene related to the travel location of said input site, wherein the verified communications connection authenticates that incoming requests for electronic postcards originate from particular ones of the predetermined group of input sites; and d) a payment device connected to said at least one input device for accepting at least one mode of payment from the sender.

16. The apparatus according to claim 15 wherein said input site is a gift shop.

17. The apparatus according to claim 15 including a plurality of images of scenes stored on at least one of said server means and said at least one input device and wherein said at least one input device permits selection of said scene related to a location of said input site from said plurality of images.

18. The apparatus according to claim 15 wherein said payment device is at least one of a credit card reader, a coin and bill acceptor, a token acceptor, and a keypad for entering a payment code obtained from a separate payment device.

* * * * *